United States Patent
Hsu et al.

(10) Patent No.: US 8,462,449 B2
(45) Date of Patent: Jun. 11, 2013

(54) OPTICAL LENS ASSEMBLY

(75) Inventors: Po-Lun Hsu, Taichung (TW); Ming-Ta Chou, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 67 days.

(21) Appl. No.: 13/175,596

(22) Filed: Jul. 1, 2011

(65) Prior Publication Data

US 2012/0188657 A1    Jul. 26, 2012

(30) Foreign Application Priority Data

Jan. 26, 2011    (TW) .............................. 100102909 A

(51) Int. Cl.
*G02B 3/02* (2006.01)
*G02B 9/14* (2006.01)

(52) U.S. Cl.
USPC .......................................... 359/716; 359/785

(58) Field of Classification Search
USPC ................. 359/708, 713–716, 754–758, 763, 359/764, 766, 771–774, 784, 785
See application file for complete search history.

(56) References Cited

U.S. PATENT DOCUMENTS

| | | | |
|---|---|---|---|
| 4,234,243 A * | 11/1980 | Takase | 359/789 |
| 6,490,102 B1 | 12/2002 | Huang | |
| 7,236,314 B2 * | 6/2007 | Liao | 359/784 |
| 7,262,925 B2 | 8/2007 | Huang | |
| 7,663,815 B2 * | 2/2010 | Nakamura | 359/773 |
| 2010/0165483 A1 * | 7/2010 | Tang et al. | 359/715 |

* cited by examiner

*Primary Examiner* — Darryl J Collins
(74) *Attorney, Agent, or Firm* — Morris Manning & Martin LLP; Tin Tingkang Xia, Esq.

(57) ABSTRACT

An optical lens assembly includes, in order from an object side to an image side, a first lens element with positive refractive power having a convex object-side surface, a second lens element with negative refractive power having a concave object-side surface and a convex image-side surface, a third lens element with positive refractive power having a convex object-side surface and a convex image-side surface. By adjusting the conditions among the above-mentioned lens elements, the optical lens assembly can favorably reduce its size and correct the aberration while obtaining superior imaging quality.

21 Claims, 10 Drawing Sheets

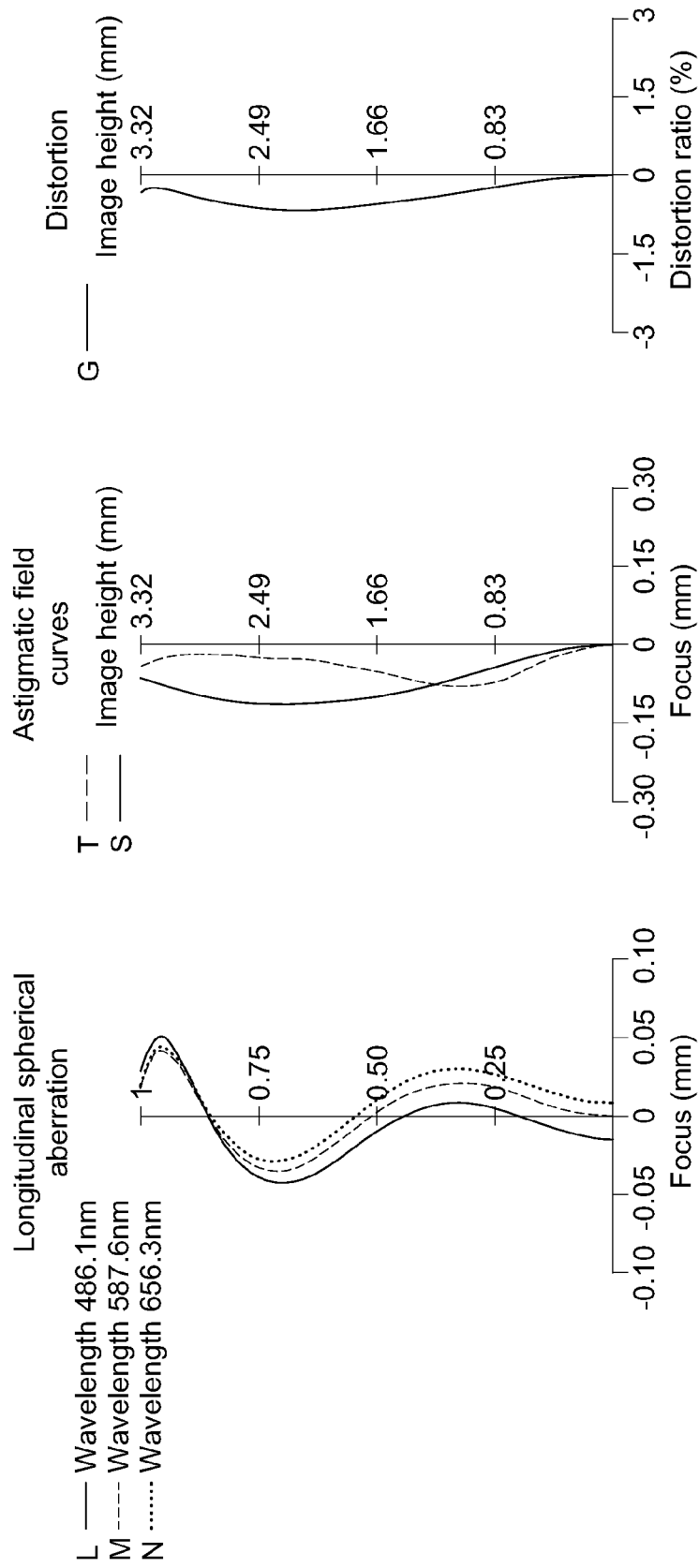

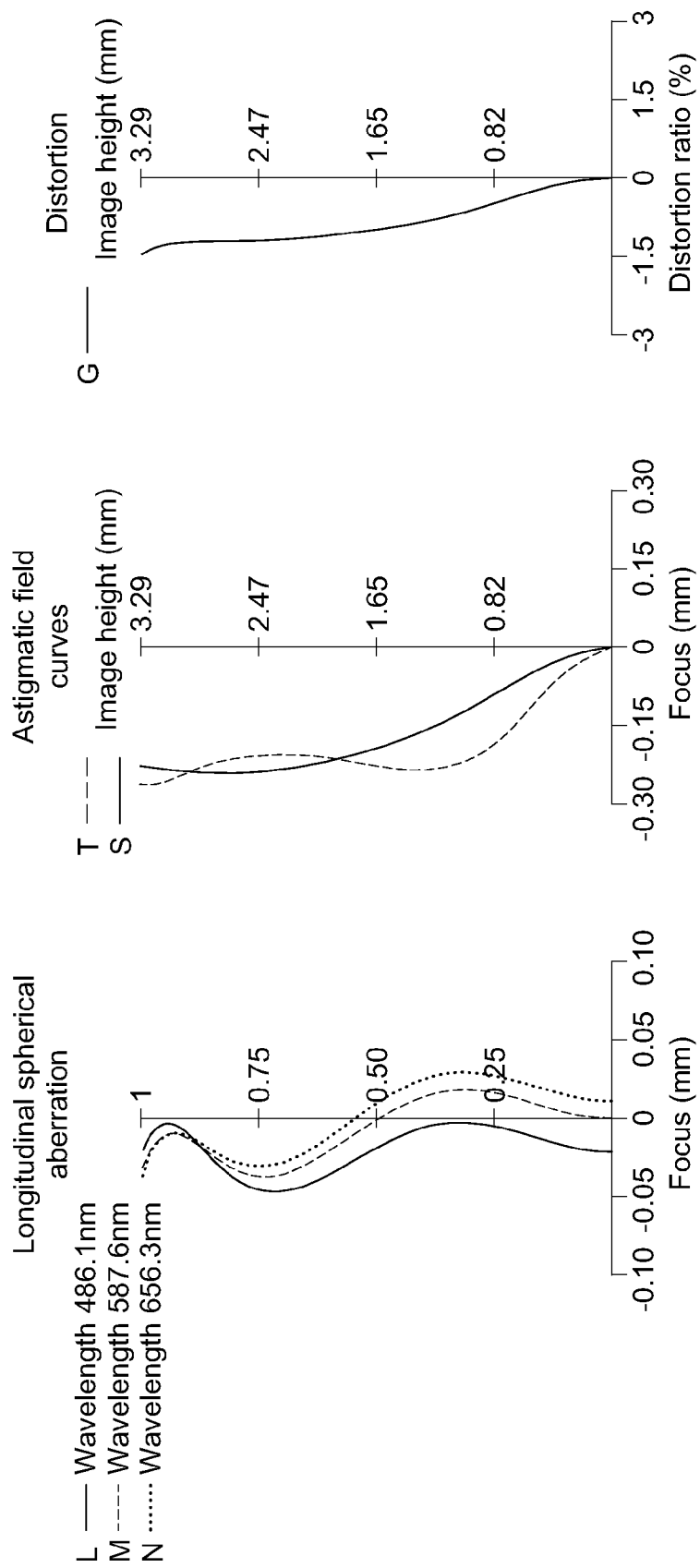

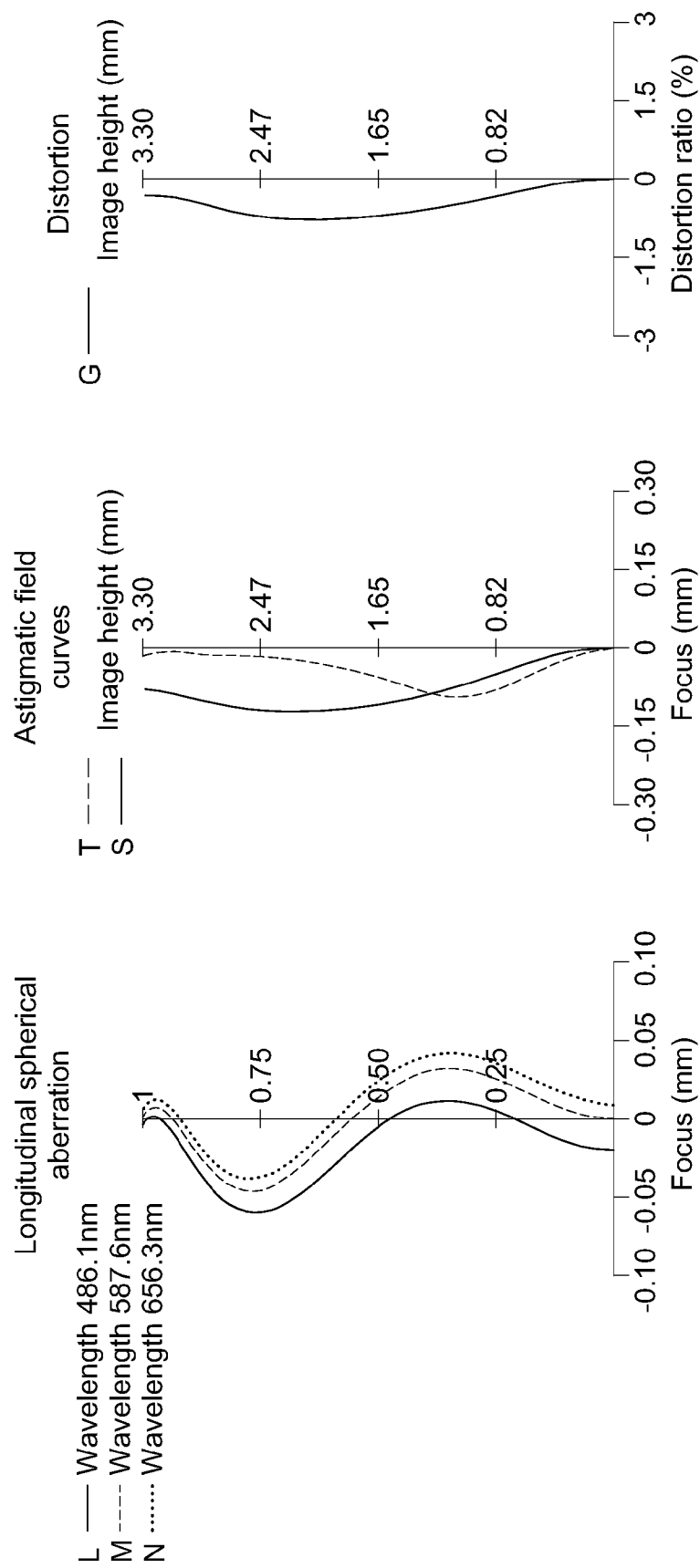

OPTICAL LENS ASSEMBLY

CROSS-REFERENCE TO RELATED APPLICATIONS

This non-provisional application claims priority under 35 U.S.C. §119(a) on Patent Application No(s). 100102909 filed in Taiwan, R.O.C. on Jan. 26, 2011, the entire contents of which are hereby incorporated by reference.

BACKGROUND

1. Technical Field

The present disclosure relates to an optical lens assembly, and more particularly to a compact optical lens assembly.

2. Related Art

In recent years, the optical lens assembly is used in a variety of application fields, especially in mobile phones, webcams, cars, surveillance cameras and electronic entertainment industries. The photo-sensing device, e.g. a sensor, of an ordinary optical lens assembly is commonly selected from a charge coupled device (CCD) and a complementary metal-oxide semiconductor (CMOS). In addition, as the advanced semiconductor manufacturing technology enables the miniaturization of pixel size of sensors, the resolution of a compact optical lens assembly is gradually increased. Such improvement leads to demands for compact optical assemblies featuring the ability of forming high-quality image on an image sensor.

A conventional camera lens used in mobile phones usually consists of three lens elements. In U.S. Pat. No. 6,490,102, for example, an optical lens system for taking image which consists of glass and plastic lens elements is disclosed. In the optical lens system, the third lens element is a spherical glass lens element. However, the spherical glass lens element reduces the freedom available for correcting the aberration of the optical lens system, which makes the camera lens more difficult to control the image quality.

Moreover, U.S. Pat. No. 7,262,925 discloses an image lens array consisting of three lens elements, wherein the stop is disposed between the first lens element and the second lens elements. Hence, the optical length of the image lens array is increased, which does not meet the demand of having a compact image lens array.

SUMMARY

According to an embodiment of the present disclosure, an optical lens assembly comprises, in order from an object side to an image side: a first lens element with positive refractive power having a convex object-side surface, a second lens element with negative refractive power having a concave object-side surface and a convex image-side surface, and a third lens element with positive refractive power having a convex object-side surface and a convex image-side surface.

Wherein, $T_{12}$ is the axial distance between the first lens element and the second lens element; $CT_1$ is the central thickness of the first lens element; $f_1$ is the focal length of the first lens element; $R_2$ is the radius of curvature of the image-side surface of the first lens element; $CT_3$ is the central thickness of the third lens element, and $\Sigma CT$ is the sum of the central thicknesses of the first lens element, the second lens element, and the third lens element. The optical lens assembly satisfies the following conditions:

$0.9 < T_{12}/CT_1 < 1.4$ (Condition 1)

$-0.4 < f_1/R_2 < 0.6$ (Condition 2)

$0.45 < CT_3/\Sigma CT < 0.75$ (Condition 3)

According to another embodiment of the present disclosure, an optical lens assembly comprises, in order from an object side to an image side: a first lens element with positive refractive power having a convex object-side surface, a second lens element with negative refractive power having a concave object-side surface and a convex image-side surface, and a third lens element with positive refractive power having a convex object-side surface and a convex image-side surface.

Wherein, $R_1$ is the radius of curvature of the object-side surface of the first lens element; $R_2$ is the radius of curvature of the image-side surface of the first lens element; f is the focal length of the optical lens assembly; $f_1$ is the focal length of the first lens element; $CT_3$ is the central thickness of the third lens element; $\Sigma CT$ is the sum of the central thicknesses of the first lens element, the second lens element, and the third lens element; $V_1$ is the Abbe number of the first lens element, and $V_2$ is the Abbe number of the second lens element. The optical lens assembly satisfies the following conditions:

$0.45 < CT_3/\Sigma CT < 0.75$ (Condition 3)

$-0.20 < R_1/R_2 < 0.25$ (Condition 4)

$0.95 < f/f_1 < 1.35$ (Condition 5)

$30.0 < V_1 - V_2 < 47.0$ (Condition 6)

BRIEF DESCRIPTION OF THE DRAWINGS

Figure 3A:
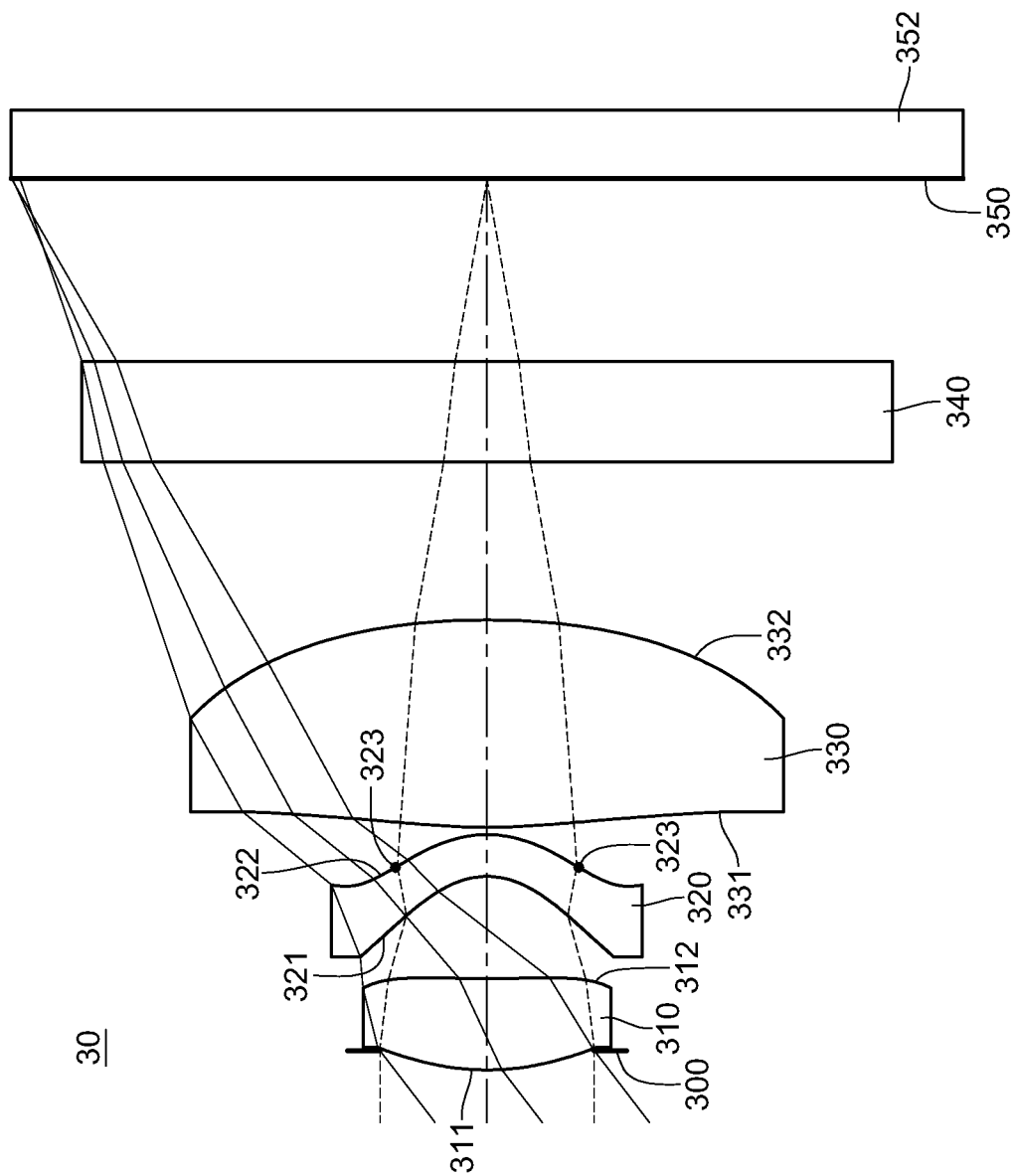
FIG. 3A is a schematic structural view of a third embodiment of an optical lens assembly according to the present disclosure.

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 2B is a schematic view of longitudinal spherical aberration curves when the lights having wavelengths of 486.1 nm, 587.6 nm, and 656.3 nm are respectively projected in the optical lens assembly in FIG. 2A;

FIG. 2C is a schematic view of astigmatic field curves when the light having the wavelength of 587.6 nm is projected in the optical lens assembly in FIG. 2A;

FIG. 2D is a schematic view of a distortion curve when the light having the wavelength of 587.6 nm is projected in the optical lens assembly;

FIG. 3B is a schematic view of longitudinal spherical aberration curves when the lights having wavelengths of 486.1 nm, 587.6 nm, and 656.3 nm are respectively projected in the optical lens assembly in FIG. 3A;

Figure 4A:
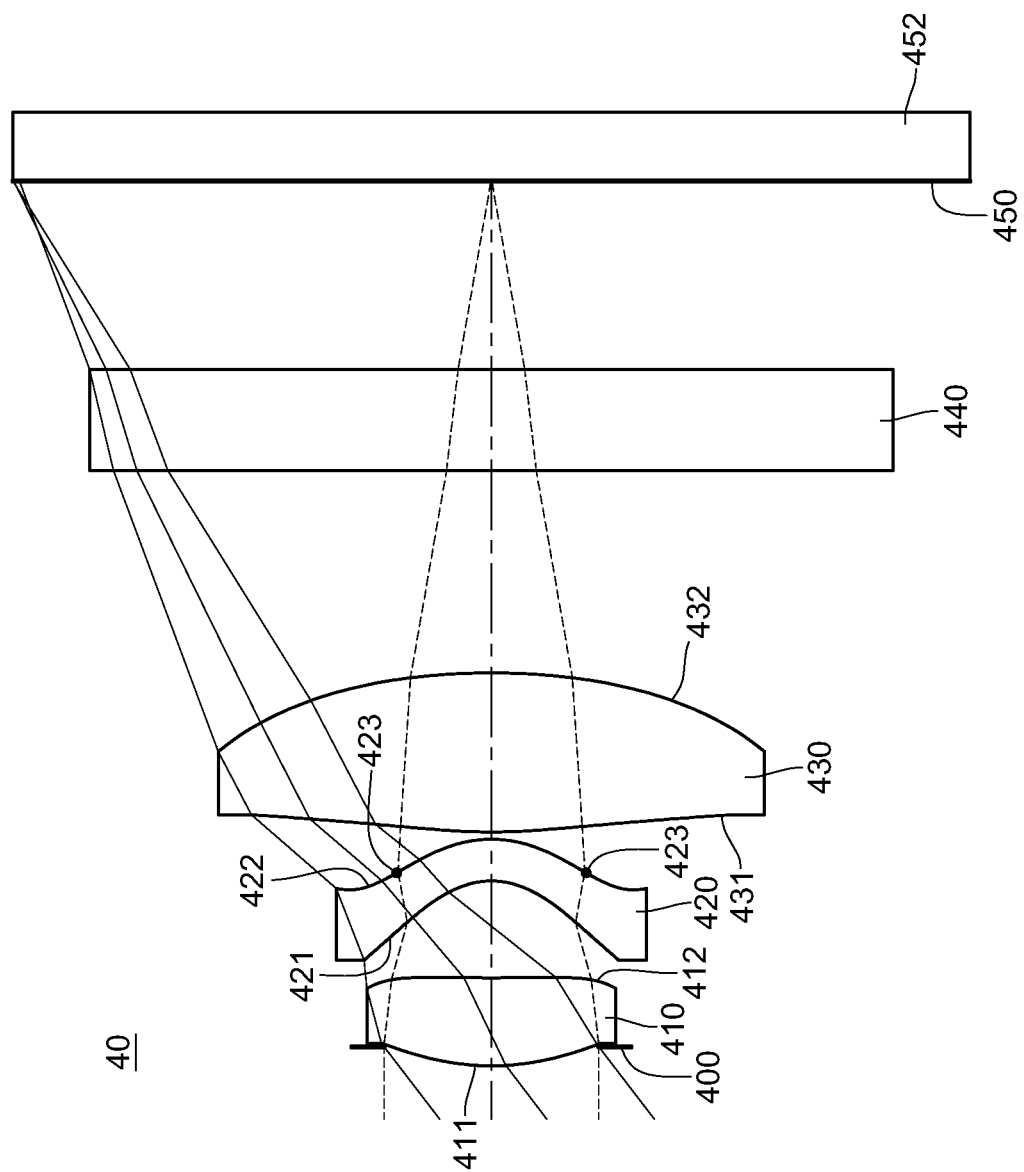
Figures 4B, 4C, 4D:
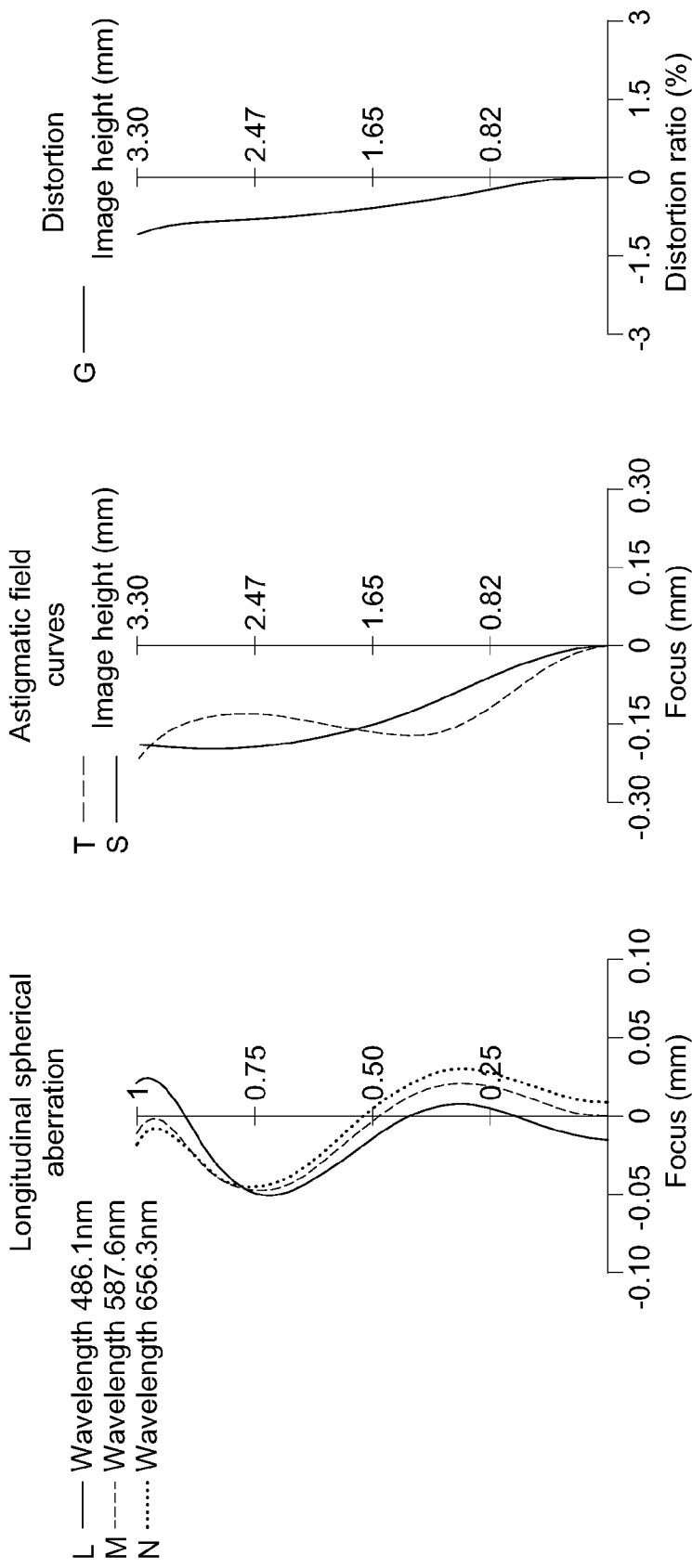
Figure 5A:
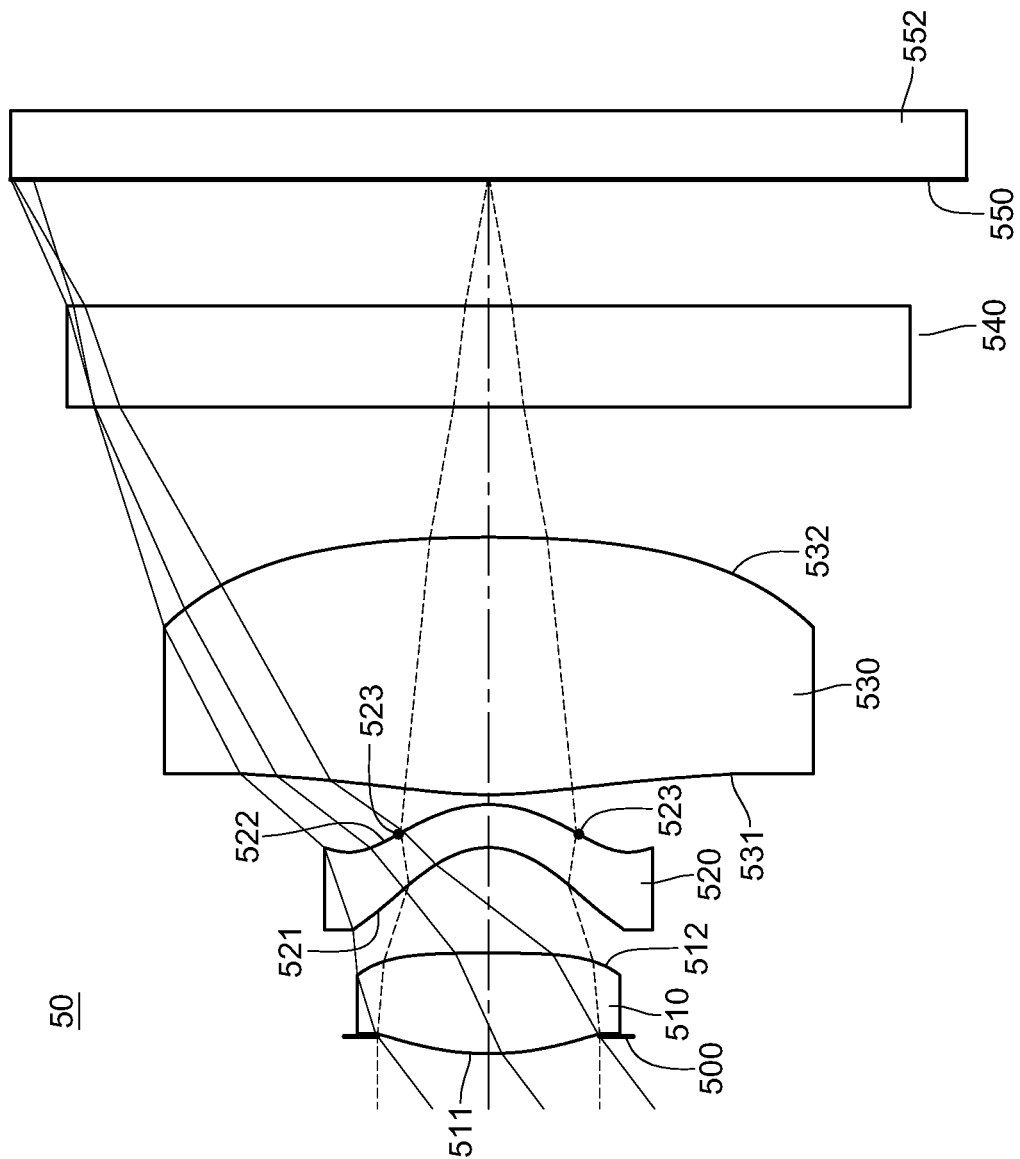

FIG. 3C is a schematic view of astigmatic field curves when the light having the wavelength of 587.6 nm is projected in the optical lens assembly in FIG. 3A;

FIG. 3D is a schematic view of a distortion curve when the light having the wavelength of 587.6 nm is projected in the optical lens assembly in FIG. 3A;

FIG. 4A is a schematic structural view of a fourth embodiment of an optical lens assembly according to the present disclosure;

FIG. 4B is a schematic view of longitudinal spherical aberration curves when the lights having wavelengths of 486.1 nm, 587.6 nm, and 656.3 nm are respectively projected in the optical lens assembly in FIG. 4A;

FIG. 4C is a schematic view of astigmatic field curves when the light having the wavelength of 587.6 nm is projected in the optical lens assembly in FIG. 4A;

FIG. 4D is a schematic view of a distortion curve when the light having the wavelength of 587.6 nm is projected in the optical lens assembly in FIG. 4A;

FIG. 5A is a schematic structural view of a fifth embodiment of an optical lens assembly according to the present disclosure;

FIG. 5B is a schematic view of longitudinal spherical aberration curves when the lights having wavelengths of 486.1 nm, 587.6 nm, and 656.3 nm are respectively projected in the optical lens assembly in FIG. 5A;

FIG. 5C is a schematic view of astigmatic field curves when the light having the wavelength of 587.6 nm is projected in the optical lens assembly in FIG. 5A; and FIG. 5D is a schematic view of a distortion curve when the light having the wavelength of 587.6 nm is projected in the optical lens assembly in FIG. 5A.

DETAILED DESCRIPTION

Figure 1A:
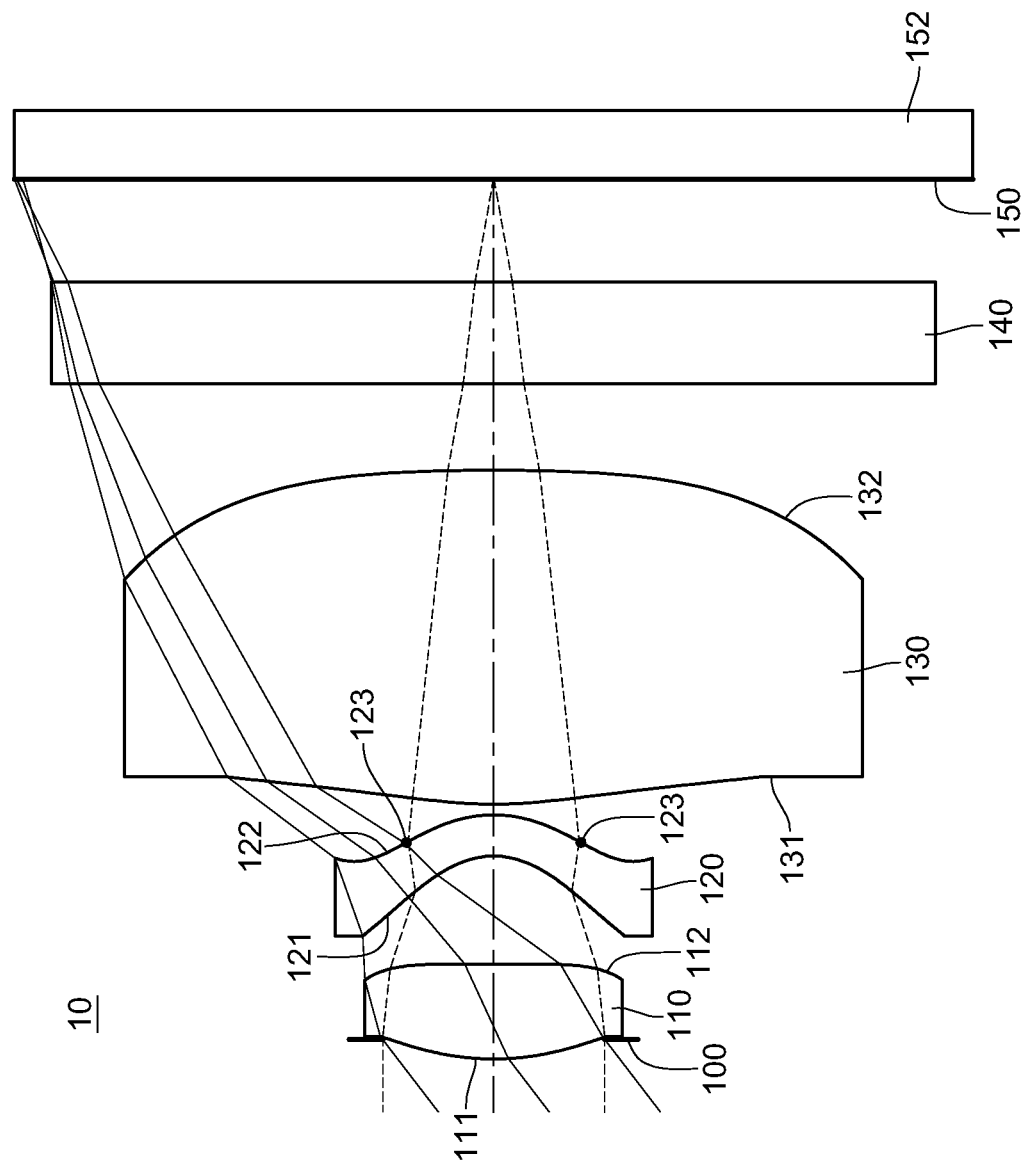
FIG. 1A is a schematic structural view of a first embodiment of an optical lens assembly according to the present disclosure.

The optical lens assembly of the present disclosure is described with FIG. 1A as an example, to illustrate that the embodiments have similar lens configurations and the same conditions of the optical lens assembly. The differences are described in detail in the following embodiments other than the embodiment described in FIG. 1.

Taking FIG. 1A as an example, the optical lens assembly 10 comprises, from an object side to an image side along an optical axis (from left to right in FIG. 1A) in sequence, a first lens element 110 with positive refractive power, a second lens element 120 with negative refractive power, and a third lens element 130 with positive refractive power.

The first lens element 110 comprises a convex object-side surface 111 and an image-side surface 112. The object-side surface 111 and the image-side surface 112 are aspheric.

The second lens element 120 comprises a concave object-side surface 121 and a convex image-side surface 122. The second lens element 120 can be made of plastic. The object-side surface 121 and the image-side surface 122 are aspheric.

The third lens element 130 comprises a convex object-side surface 131 and a convex image-side 132.

The optical lens assembly 10 of the present disclosure satisfies the following conditions:

$0.9 < T_{12}/CT_1 < 1.4$ (Condition 1)

$-0.4 < f_1/R_2 < 0.6$ (Condition 2)

$0.45 < CT_3/\Sigma CT < 0.75$ (Condition 3)

$-0.20 < R_1/R_2 < 0.25$ (Condition 4)

$0.95 < f/f_1 < 1.35$ (Condition 5)

$30.0 < V_1 - V_2 < 47.0$ (Condition 6)

$T_{12}$ is the axial distance between the image-side surface 112 and the object-side surface 121; $CT_1$ is the central thickness of the first lens element 110; $f_1$ is the focal length of the first lens element 110; $R_2$ is the radius of curvature of the image-side surface 112; $CT_3$ is the central thickness of the third lens element 130; $\Sigma CT$ is the sum of the central thicknesses of the first lens element 110, the second lens element 120, and the third lens element 130; $R_1$ is the radius of curvature of the object-side surface 111; f is the focal length of the optical lens assembly 10; $V_1$ is the Abbe number of the first lens element 110, and $V_2$ is the Abbe number of the second lens element 120.

In the optical lens assembly 10, the first lens element 110 with positive refractive power provides part of the refractive power needed by the optical lens assembly 10 and reduces the total optical length. The second lens element 120 with negative refractive power can correct the aberration and the chromatism of the optical lens assembly 10. The third lens element 130 with positive refractive power provides the positive refractive power along with the first lens element 110 to reduce the sensitivity of the optical lens assembly 10.

Furthermore, when the first lens element 110 has the convex object-side surface 111, the refractive power of the first lens element 110 can be distributed effectively, thereby reducing the total optical length of the optical lens assembly 10. When the second lens element 120 has the concave object-side surface 121 and the convex image-side surface 122, the astigmatism of the optical lens assembly 10 can be corrected. When the third lens element 130 has the convex object-side surface 131 and the convex image-side surface 132, the total optical length of the optical lens assembly 10 is reduced.

When the optical lens assembly satisfies 10 Condition 1, the first lens element 110 has the appropriate central thickness and the appropriate axial distance between the image-side surface 112 and the object-side surface 121, which helps reduce the total optical length of the optical lens assembly 10. When the optical lens assembly 10 satisfies Condition 2, the object-side surface 111 has the appropriate radius of curvature, which helps reduce the total optical length of the optical lens assembly 10. When the optical lens assembly 10 satisfies Condition 3, the third lens element 130 has the appropriate central thickness, which benefits the assembling process of the optical lens assembly 10.

When the optical lens assembly 10 satisfies Condition 4, the radii of curvature of the object-side surface 111 and the image-side surface 112 are appropriate for correcting the spherical aberration of the optical lens assembly 10. When the optical lens assembly 10 satisfies Condition 5, the refractive power of the first lens element 110 is well balanced, and, therefore, the total optical length of the optical lens assembly 10 can be effectively controlled to maintain the purpose of miniaturizing the optical lens assembly 10. In addition, such well balanced refractive power of the first lens element 110 can also prevent the excessive increase of the high order spherical aberration of the optical lens assembly 10 and improve the image quality of the optical lens assembly 10. When the optical lens assembly 10 satisfies Condition 6, correcting the chromatism of the optical lens assembly 10 is achieved.

Besides, the optical lens assembly 10 according to the present disclosure further comprises a stop, which can be an aperture stop 100, disposed between the object-side (as shown the left side in FIG. 1A) and the first lens element 110. The optical lens assembly 10 further comprises, in the right side of the third lens element 130 along the optical axis (from left to right in FIG. 1A) in sequence, an infrared filter 140, an image plane 150, and an image sensor 152 disposed on the image plane 150.

Moreover, the optical lens assembly 10 of the present disclosure may further satisfy at least one of the following conditions:

$$-6.0<(R_3+R_4)/(R_3-R_4)<-3.0 \quad \text{(Condition 7)}$$

$$0.05<CT_2/CT_3<0.4 \quad \text{(Condition 8)}$$

$$0.9<|f_1/f_2|<1.2 \quad \text{(Condition 9)}$$

$$0.9<SL/TTL<1.1 \quad \text{(Condition 10)}$$

$$-0.15<R_3/f<-0.05 \quad \text{(Condition 11)}$$

$$0<CT_2/f<0.13 \quad \text{(Condition 12)}$$

$$-1.0<f/R_6<-0.2 \quad \text{(Condition 13)}$$

$$TTL/ImgH<1.85 \quad \text{(Condition 14)}$$

$R_3$ is the radius of curvature of the object-side surface 121; $R_4$ is the radius of curvature of the image-side surface 122; $CT_2$ is the central thickness of the second lens element 120; $f_2$ is the focal length of the second lens element 120; SL is the axial distance between the aperture stop 100 and the image plane 150; TTL is the axial distance between the object-side surface 111 and the image plane 150; $R_6$ is the radius of curvature of the image-side surface 132, and ImgH is one half of the diagonal length of the effective photosensitive area of the image sensor 152.

In this and some embodiments, the central thicknesses $CT_1$, $CT_2$ and $CT_3$ are the thicknesses of the first lens element 110, the second lens element 120 and the third lens element 130 on the optical axis respectively.

When the optical lens assembly 10 of the present disclosure satisfies Condition 7, the object-side surface 121 and the image-side surface 122 have the appropriate radii of curvature which help correct the astigmatism and the high order aberration of the optical lens assembly 10. When the optical lens assembly 10 of the present disclosure satisfies Condition 8, the second lens element 120 and the third lens element 130 have the appropriate central thicknesses which benefit the assembling process of optical lens assembly 10. When the optical lens assembly 10 of the present disclosure satisfies Condition 9, the second lens element 120 has the appropriate negative refractive power which helps correct the aberration. When the optical lens assembly 10 of the present disclosure satisfies Condition 10, the position of the aperture stop 100 is favorable to reduce the total optical length of the optical lens assembly 10 and help the optical lens assembly 10 obtain the optimum telecentric feature of the image side. When the optical lens assembly 10 of the present disclosure satisfies Condition 11, the aberration of the optical lens assembly 10 is corrected. When the optical lens assembly 10 of the present disclosure satisfies Condition 12, the second lens element 120 has the appropriate central thickness, thereby reducing the total optical length of the optical lens assembly 10.

When the optical lens assembly 10 of the present disclosure satisfies Condition 13, the total optical length of the optical lens assembly 10 is reduced. When the optical lens assembly 10 of the present disclosure satisfies Condition 14, the optical lens assembly 10 can maintain a compact size which is favorable for the installation of the optical lens assembly 10 into the mobile electronic devices.

In the optical lens assembly 10 according to the present disclosure, there is at least one inflection point 123 on the radial section of the second lens element 120, such that the incident angle at which the light is projected onto the image plane 150 from the off-axis field can be reduced to further correct the off-axis aberrations.

Furthermore, in the optical lens assembly 10 of the present disclosure, all the lenses may be made of glass or plastic. If a lens is made of glass, there is more freedom in distributing the refractive power for the optical lens assembly 10. If a lens element is made of plastic, the manufacturing cost is effectively reduced. In addition, the surfaces of lens elements can be aspheric. Aspheric profiles allow more design parameter freedom for reducing aberrations and total number of the lens elements, so that the total optical length of the optical lens assembly 10 can be reduced effectively.

In the optical lens assembly 10 of the present disclosure, a convex surface means the surface is convex at a paraxial site. A concave surface means the surface is concave at a paraxial site. In addition, at least one stop (such as glare stops, field stops, or other types of stops) may be disposed within the optical imaging system 10 if necessary to eliminate the stray light, to adjust the field of view or to provide other improvements concerning the image quality.

As for the optical lens assembly 10 of the present disclosure, the specific schemes are further described with the following embodiments. Parameters in the embodiments are defined as follows. Fno is an f-number value of the optical lens assembly, and HFOV is a half of a maximal viewing angle in the optical lens assembly. The aspheric surface in the embodiments may be represented by, but not limited to, the following aspheric surface equation (Condition ASP):

$$X(Y) = (Y^2/R)/(1+sqrt(1-(1+k)*(Y/R)^2)) + \sum_i (Ai)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, and 12.

The First Embodiment

Embodiment 1

FIG. 1A is a schematic structural view of a first embodiment of an optical lens assembly according to the present disclosure. In this embodiment, the wavelength of the light received by the optical lens assembly 10 is 587.6 nm, but the wavelength of the light received by the optical lens assembly 10 may be adjusted according to actual requirements, and is not limited to the wavelength value mentioned above.

In this embodiment, the first lens element 110 with the positive refractive power comprises the convex object-side surface 111. The second lens element 120 with the negative refractive power comprises the concave object-side surface 121, the convex image-side surface 122, and two inflection points 123 on the radial section of the second lens element 120 shown in FIG. 1A. The third lens element 130 with the positive refractive power comprises the convex object-side surface 131 and the convex image-side surface 132.

The detailed data of the optical lens assembly 10 is as shown in Table 1-1 below.

TABLE 1-1

Embodiment 1
f = 4.37 mm, Fno = 2.85, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.134 | | | | |
| 2 | Lens 1 | 1.807920 (ASP) | 0.657 | Plastic | 1.544 | 55.9 | 3.42 |
| 3 | | 53.969500 (ASP) | 0.746 | | | | |
| 4 | Lens 2 | −0.553640 (ASP) | 0.285 | Plastic | 1.634 | 23.8 | −3.58 |
| 5 | | −0.878640 (ASP) | 0.073 | | | | |
| 6 | Lens 3 | 2.698350 (ASP) | 2.310 | Plastic | 1.535 | 56.3 | 4.57 |
| 7 | | −18.071900 (ASP) | 0.600 | | | | |
| 8 | IR-filter | Plano | 0.700 | Glass | 1.517 | 64.2 | — |
| 9 | | Plano | 0.712 | | | | |
| 10 | Image | Plano | — | | | | |

Note:
Reference wavelength is d-line 587.6 nm

In Table 1-1, the first lens element 110, the second lens element 120, and the third lens element 130 are made of plastic. The first lens element 110, the second lens element 120, and the third lens element 130 are aspheric, and the aspheric surfaces can satisfy Condition ASP, but are not limited thereto. As for the parameters of the aspheric surfaces, reference is made to Table 1-2 below.

TABLE 1-2

Aspheric Coefficients

| | Surface# | | |
|---|---|---|---|
| | 2 | 3 | 4 |
| k | −9.25079E+00 | 0.00000E+00 | −1.21057E+00 |
| $A_4$ | 1.61459E−01 | −7.80223E−02 | 8.57517E−02 |
| $A_6$ | −1.85010E−01 | −2.04375E−01 | −6.22454E−02 |
| $A_8$ | 1.17771E−01 | 2.11598E−01 | 3.89978E−01 |
| $A_{10}$ | −1.28998E−01 | −1.64901E−01 | −9.94783E−02 |
| $A_{12}$ | 1.87062E−02 | — | −1.95944E−01 |

| | Surface# | | |
|---|---|---|---|
| | 5 | 6 | 7 |
| k | −1.36572E+00 | −4.09976E+01 | −1.00000E+00 |
| $A_4$ | −4.87802E−02 | −1.18620E−02 | −1.56659E−02 |
| $A_6$ | 3.15433E−01 | 5.08726E−03 | 5.45353E−04 |
| $A_8$ | −7.47962E−02 | −1.49233E−03 | 1.19807E−04 |
| $A_{10}$ | 4.00796E−02 | 2.93410E−04 | −3.99060E−05 |
| $A_{12}$ | −3.80479E−02 | −2.44457E−05 | 2.45702E−06 |

In Table 1-1, the curvature radius, the thickness and the focal length are shown in millimeters (mm). Surface numbers 0-10 represent the surfaces sequentially arranged from the object-side to the image-side along the optical axis. "f" stands for the focal length, "Fno" is the f-number, and "HFOV" is the half field of view of this embodiment. In Table 1-2, k represents the conic coefficient of the equation of the aspheric surface profiles. A1-A12 represent the aspheric coefficients ranging from the 1st order to the 12th. All labels for Tables of the remaining embodiments share the same definitions as those in Table 1-1 and Table 1-2 of the first embodiment, and their definitions will not be stated again.

The content of Table 1-3 may be deduced from Table 1-1.

TABLE 1-3

Embodiment 1

| f (mm) | 4.37 | $f_1/R_2$ | 0.06 |
|---|---|---|---|
| Fno | 2.85 | $R_3/f$ | −0.13 |
| HFOV(deg.) | 37.5 | $R_1/R_2$ | 0.03 |
| $V_1 - V_2$ | 32.1 | $(R_3 + R_4)/(R_3 - R_4)$ | −4.41 |
| SL/TTL | 0.98 | $CT_2/CT_3$ | 0.12 |
| TTL/ImgH | 1.77 | $CT_3/\Sigma CT$ | 0.71 |
| $f/f_1$ | 1.28 | $T_{12}/CT_1$ | 1.135 |
| $|f_1/f_2|$ | 0.96 | $CT_2/f$ | 0.06 |
| $f/R_6$ | −0.24 | | |

In this embodiment, the $T_{12}/CT_1$ of the optical lens assembly 10 is 1.135, which satisfies the Condition 1. The $f_1/R_2$ of the optical lens assembly 10 is 0.06, which satisfies the Condition 2. The $CT_3/\Sigma CT$ of the optical lens assembly 10 is 0.71, which satisfies the Condition 3. The $R_1/R_2$ of the optical lens assembly 10 is 0.03, which satisfies the Condition 4.

The $f/f_1$ of the optical lens assembly 10 is 1.28, which satisfies the Condition 5. The $V_1-V_2$ of the optical lens assembly 10 is 32.1, which satisfies the Condition 6. The $(R_3+R_4)/(R_3-R_4)$ of the optical lens assembly 10 is −4.41, which satisfies the Condition 7. The $CT_2/CT_3$ of the optical lens assembly 10 is 0.12, which satisfies the Condition 8. The $|f_1/f_2|$ of the optical lens assembly 10 is 0.96, which satisfies the Condition 9. The SL/TTL of the optical lens assembly 10 is 0.98, which satisfies the Condition 10. The $R_3/f$ of the optical lens assembly 10 is −0.13, which satisfies the Condition 11. The $CT_2/f$ of the optical lens assembly 10 is 0.06, which satisfies the Condition 12. The $f/R_6$ of the optical lens assembly 10 is −0.24, which satisfies the Condition 13. The TTL/ImgH of the optical lens assembly 10 is 1.77, which satisfies the Condition 14.

Figures 1B, 1C, 1D:
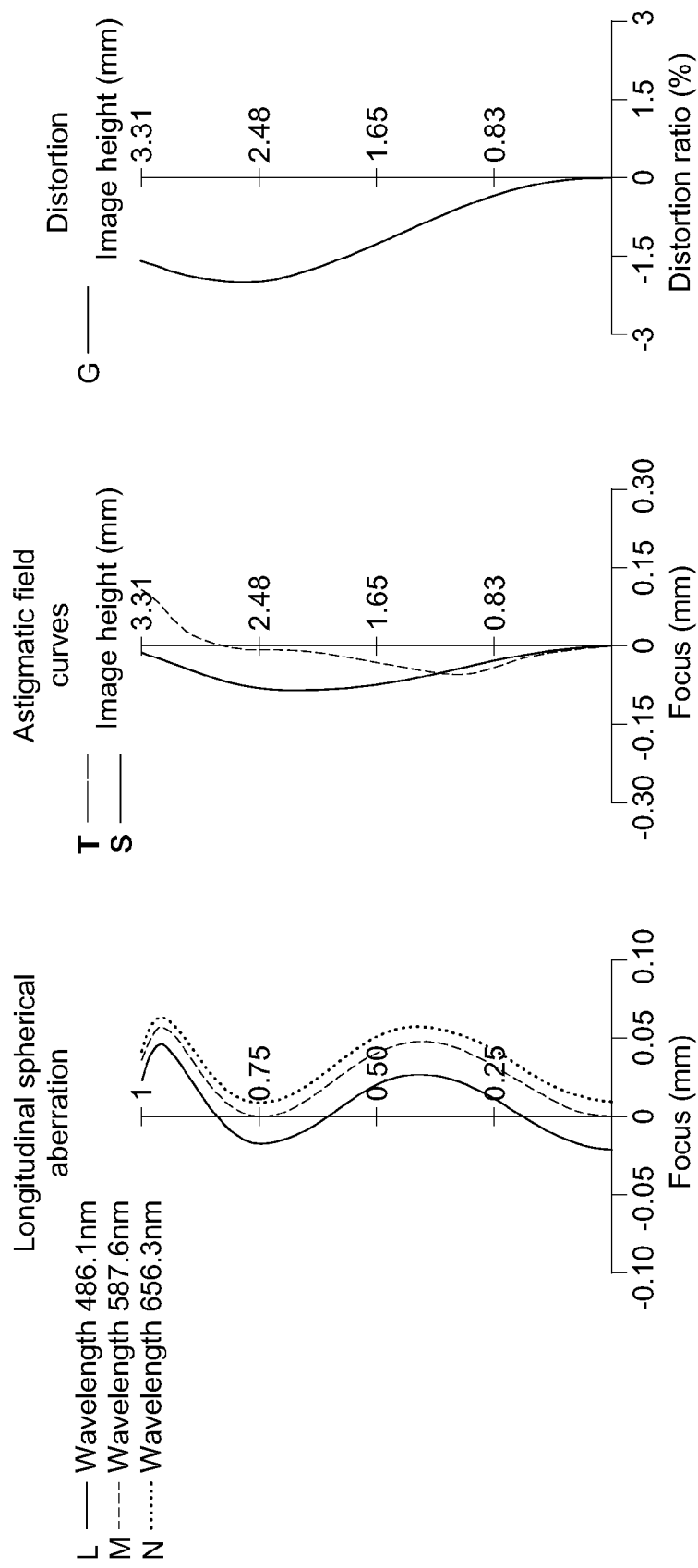
FIG. 1B is a schematic view of longitudinal spherical aberration curves when the lights having wavelengths of 486.1 nm, 587.6 nm, and 656.3 nm are respectively projected in the optical lens assembly in FIG. 1A.
FIG. 1C is a schematic view of astigmatic field curves when the light having the wavelength of 587.6 nm is projected in the optical lens assembly in FIG. 1A.
FIG. 1D is a schematic view of a distortion curve when the light having the wavelength of 587.6 nm is projected in the optical lens assembly in FIG. 1A.

FIG. 1B is a schematic view of longitudinal spherical aberration curves when the lights having wavelengths of 486.1 nm, 587.6 nm, and 656.3 nm are respectively projected in the optical lens assembly in FIG. 1A. The longitudinal spherical aberration curve of the light having the wavelength of 486.1 nm in the optical lens assembly 10 is indicated by a solid line L in FIG. 1B. The longitudinal spherical aberration curve of the light having the wavelength of 587.6 nm in the optical lens assembly 10 is indicated by a dashed line M in FIG. 1B. The longitudinal spherical aberration curve of the light having the wavelength of 656.3 nm in the optical lens assembly 10 is indicated by a dotted line N in FIG. 1B. Horizontal axis is the focus position (millimeter, mm), and vertical axis is the normalized entrance pupil or the aperture value. In other words, after the light enters the in the optical lens assembly 10, the differences between of the focus positions of the paraxial light (the longitudinal coordinate is close to 0) and the fringe light (the longitudinal coordinate is close to 1) can be observed from the longitudinal spherical aberration curves. It can be observed from FIG. 1B that, no matter the wavelength of the light received by the optical lens assembly 10 in this embodiment is 486.1 nm, 587.6 nm, or 656.3 nm, the longitudinal spherical aberration generated by the optical lens assembly 10 is within the range of −0.025 mm to 0.075.

In the second embodiment to the fifth embodiment and the schematic views of the longitudinal spherical aberration curves in FIGS. 2B, 3B, 4B, and 5B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for conciseness.

FIG. 1C is a schematic view of astigmatic field curves when the light having the wavelength of 587.6 nm is projected in the optical lens assembly in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and vertical axis is the image height (mm). In other words, the differences of the focus positions due to different curvatures of the tangential plane and the sagittal plane can be seen from the astigmatic field curves. It can be observed from FIG. 1C that when the light having the wavelength of 587.6 nm is projected in the optical lens assembly 10, the astigmatic field curvature of the tangential plane is within the range of 0.15 mm to 0.15 mm, and the astigmatic field curvature of the sagittal plane is within the range of −0.150 mm to 0.0 mm.

In the second embodiment to the fifth embodiment and the schematic views of the astigmatic field curves in FIGS. 2C, 3C, 4C, and 5C, the solid line S indicates the astigmatic field curve of the sagittal plane, and the dashed line T indicates the astigmatic field curve of the tangential plane, which will not be repeated herein for conciseness.

FIG. 1D is a schematic view of a distortion curve when the light having the wavelength of 587.6 nm is projected in the optical lens assembly in FIG. 1A. The horizontal axis is the distortion ratio (%), and the vertical axis is the image height (mm). In other words, the differences of the distortion ratios caused by different image heights can be seen from the distortion curve G. It can be observed from FIG. 1D that, the distortion ratio generated when the light having the wavelength of 587.6 nm is projected in the optical lens assembly 10 is within a range of −3.0% to 0%. As shown in FIGS. 1B to 1D, the optical lens assembly 10, designed according to the first embodiment, is capable of effectively correcting various aberrations.

In the second embodiment to the fifth embodiment and the schematic views of the distortion curves in FIGS. 2D, 3D, 4D, and 5D, the solid line G indicates the distortion curve of the light having the wavelength of 587.6 nm, which will not be repeated herein for conciseness.

It should be noted that, the distortion curves and the astigmatic field curves generated when the lights having the wavelength of 486.1 nm and 656.3 nm are projected in the optical lens assembly 10 are very similar to the distortion curve and the astigmatic field curves generated when the light having the wavelength of 587.6 nm is projected in the optical lens assembly 10. In order to prevent the confusion of reading the curves in FIGS. 1C and 1D, the distortion curve and the astigmatic field curves of wavelengths of 486.1 nm and 656.3 nm projected in the optical lens assembly 10 are not shown in FIGS. 1C and 1D, and the same is throughout the rest of the embodiments of this present disclosure.

The Second Embodiment

Embodiment 2

Figure 2A:
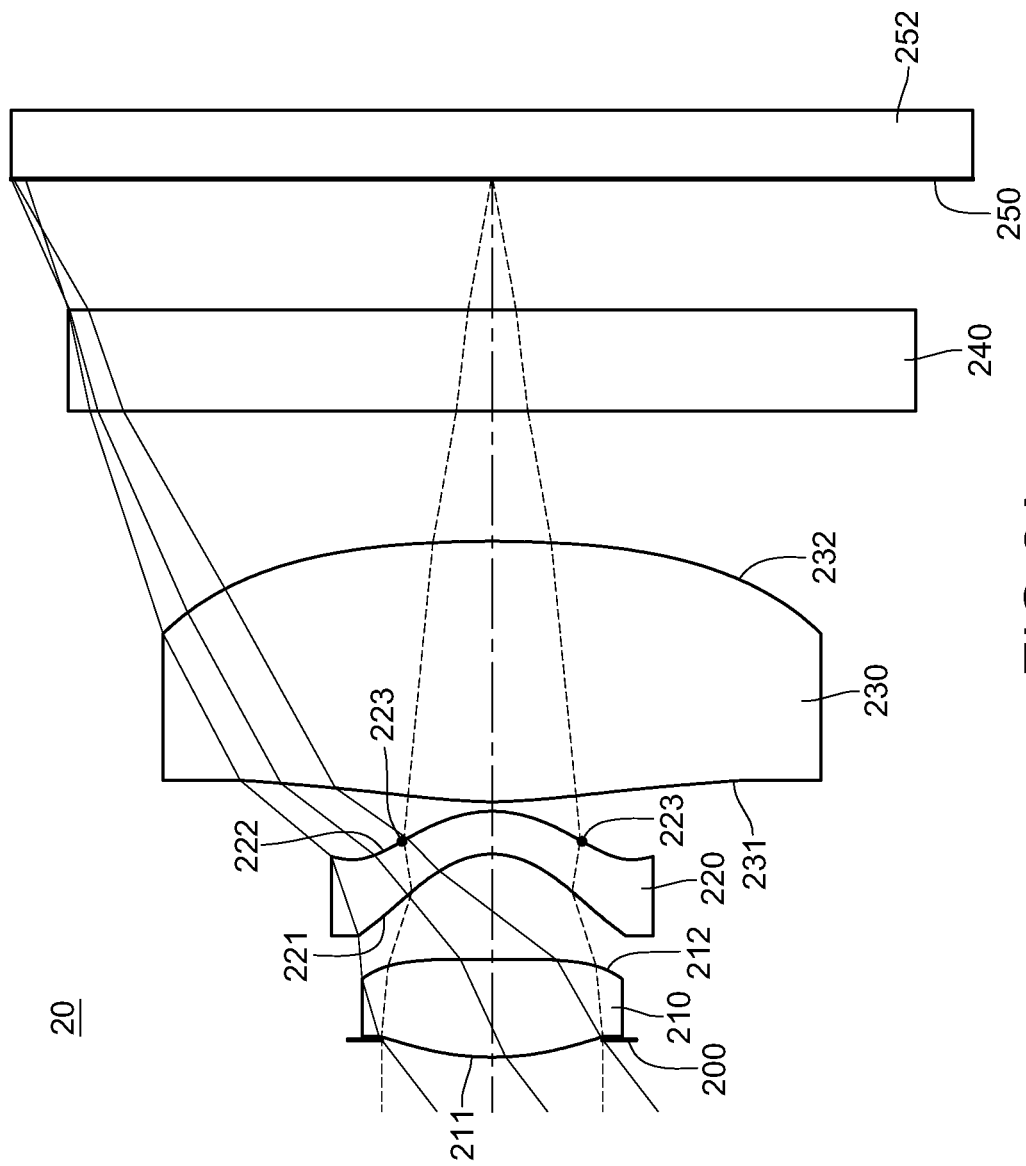
FIG. 2A is a schematic structural view of a second embodiment of an optical lens assembly according to the present disclosure.

FIG. 2A is a schematic structural view of a second embodiment of an optical lens assembly according to the present disclosure. The specific implementation and elements of the second embodiment are substantially the same as those in the first embodiment. The element symbols in the second embodiment all begin with "2", which correspond to those in the first embodiment with the same function or structure. For conciseness, only the differences are illustrated below, and the similarities will not be repeated herein.

In this embodiment, for example, the wavelength of the light received by the optical lens assembly 20 is 587.6 nm, but this wavelength may be adjusted according to actual requirements, and is not limited to the wavelength value mentioned above.

In this embodiment, a first lens element 210 with positive refractive power comprises a convex object-side surface 211. A second lens element 220 with negative refractive power comprises a concave object-side surface 221, a convex image-side surface 222 and two inflection points 223 on the radial section of the second lens element 220 shown in FIG. 2A. A third lens element 230 with positive refractive power comprises a convex object-side surface 231 and a convex image-side surface 232.

The detailed data of the optical lens assembly 20 is as shown in Table 2-1 below.

TABLE 2-1

Embodiment 2
f = 4.35 mm, Fno = 2.85, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.123 | | | | |
| 2 | Lens 1 | 1.883190 (ASP) | 0.678 | Glass | 1.517 | 64.2 | 3.52 |
| 3 | | −45.048900 (ASP) | 0.727 | | | | |
| 4 | Lens 2 | −0.539470 (ASP) | 0.295 | Plastic | 1.634 | 23.8 | −3.69 |
| 5 | | −0.850140 (ASP) | 0.067 | | | | |
| 6 | Lens 3 | 2.974810 (ASP) | 1.800 | Plastic | 1.535 | 56.3 | 4.46 |
| 7 | | −9.533000 (ASP) | 0.900 | | | | |

TABLE 2-1-continued

Embodiment 2
f = 4.35 mm, Fno = 2.85, HFOV = 37.4 deg.

| Surface # | | Curvature Radius | Thickness | Material | Index | Abbe # | Focal length |
|---|---|---|---|---|---|---|---|
| 8 | IR-filter | Plano | 0.700 | Glass | 1.517 | 64.2 | — |
| 9 | | Plano | 0.904 | | | | |
| 10 | Image | Plano | — | | | | |

Note:
Reference wavelength is d-line 587.6 nm

In Table 2-1, the first lens element 210 is made of glass. The second lens element 220 and the third lens element 230 are made of plastic. The first lens element 210, the second lens element 220, and the third lens element 230 are aspheric, and the aspheric surfaces can satisfy Condition ASP, but are not limited thereto. As for the parameters of the aspheric surfaces, reference is made to Table 2-2 below.

TABLE 2-2

Aspheric Coefficients

| | Surface# | | |
|---|---|---|---|
| | 2 | 3 | 4 |
| k | −1.01405E+01 | 0.00000E+00 | −1.20993E+00 |
| $A_4$ | 1.55686E−01 | −8.55294E−02 | 8.76213E−02 |
| $A_6$ | −1.92088E−01 | −2.12825E−01 | −5.54582E−02 |
| $A_8$ | 1.11426E−01 | 2.11752E−01 | 4.01494E−01 |
| $A_{10}$ | −1.26500E−01 | −1.47332E−01 | −8.56068E−02 |
| $A_{12}$ | 2.88333E−02 | — | −1.90863E−01 |

| | Surface# | | |
|---|---|---|---|
| | 5 | 6 | 7 |
| k | −1.37508E+00 | −4.65790E+01 | −1.00000E+00 |
| $A_4$ | −4.83843E−02 | −1.40148E−02 | −1.40928E−02 |
| $A_6$ | 3.14696E−01 | 5.04555E−03 | 3.95746E−04 |
| $A_8$ | −7.57069E−02 | −1.40177E−03 | 9.70806E−05 |
| $A_{10}$ | 3.98389E−02 | 3.15619E−04 | −4.19950E−05 |
| $A_{12}$ | −3.69277E−02 | −3.35871E−05 | 2.04656E−06 |

The content of Table 2-3 may be deduced from Table 2-1.

TABLE 2-3

Embodiment 2

| f (mm) | 4.35 | $f_1/R_2$ | −0.08 |
|---|---|---|---|
| Fno | 2.85 | $R_3/f$ | −0.12 |
| HFOV(deg.) | 37.4 | $R_1/R_2$ | −0.04 |
| $V_1 - V_2$ | 40.4 | $(R_3 + R_4)/(R_3 - R_4)$ | −4.47 |
| SL/TTL | 0.98 | $CT_2/CT_3$ | 0.16 |
| TTL/ImgH | 1.76 | $CT_3/\Sigma CT$ | 0.65 |
| $f/f_1$ | 1.24 | $T_{12}/CT_1$ | 1.072 |
| $|f_1/f_2|$ | 0.95 | $CT_2/f$ | 0.07 |
| $f/R_6$ | −0.46 | | |

FIG. 2B is a schematic view of longitudinal spherical aberration curves when the lights having wavelengths of 486.1 nm, 587.6 nm, and 656.3 nm are respectively projected in the optical lens assembly in FIG. 2A. It can be observed from FIG. 2B that, when the different wavelengths, 486.1 nm, 587.6 nm, and 656.3 nm, of the light are received by the optical lens assembly 20, the longitudinal spherical aberrations generated by the optical lens assembly 20 are within a range of −0.05 mm to 0.06 mm.

FIG. 2C is a schematic view of astigmatic field curves when the light having the wavelength of 587.6 nm is projected in the optical lens assembly in FIG. 2A. It can be observed from FIG. 2C that when the light having the wavelength of 587.6 nm is projected in the optical lens assembly 20, the astigmatic field curvature of the tangential plane generated is within a range of −0.05 mm to 0.15 mm, and the astigmatic field curvature of the sagittal plane is within a range of −0.08 mm to 0.0 mm.

FIG. 2D is a schematic view of a distortion curve when the light having the wavelength of 587.6 nm is projected in the optical lens assembly in FIG. 2A. It can be observed from FIG. 2D that, the distortion ratio generated when the light having the wavelength of 587.6 nm is projected in the optical lens assembly 20 is within a range of 0.8% to 0%. As shown in FIGS. 2B to 2D, the optical lens assembly 20, designed according to the second embodiment, is capable of effectively correcting various aberrations.

The Third Embodiment

Embodiment 3

FIG. 3A is a schematic structural view of a third embodiment of an optical lens assembly according to the present disclosure. The specific implementation and elements of the third embodiment are substantially the same as those in the first embodiment. The element symbols in the third embodiment all begin with "3", which correspond to those in the first embodiment with the same function or structure. For conciseness, only the differences are illustrated below, and the similarities will not be repeated herein.

In this embodiment, for example, the wavelength of the light received by the optical lens assembly 30 is 587.6 nm, but the wavelength may be adjusted according to actual requirements, and is not limited to the wavelength value mentioned above.

In this embodiment, a first lens element 310 with positive refractive power comprises a convex object-side surface 311. A second lens element 320 with negative refractive power comprises a concave object-side surface 321, a convex image-side surface 322 and two inflection points 323 on the radial section of the second lens element 320 shown in FIG. 3A. A third lens element 330 with positive refractive power comprises a convex object-side surface 331 and a convex image-side surface 332.

The detailed data of the optical lens assembly 30 is as shown in Table 3-1 below.

TABLE 3-1

Embodiment 3
f = 4.39 mm, Fno = 2.95, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. | Plano | −0.135 | | | | |
| 2 | Lens 1 | 1.760610 | 0.635 | Glass | 1.517 | 64.2 | 3.92 |
| 3 | | 11.834300 | 0.711 | | | | |
| 4 | Lens 2 | −0.525590 (ASP) | 0.291 | Plastic | 1.634 | 23.8 | −4.00 |
| 5 | | −0.805340 (ASP) | 0.050 | | | | |
| 6 | Lens 3 | 3.868900 | 1.443 | Plastic | 1.544 | 55.9 | 4.27 |
| 7 | | −5.059900 (ASP) | 1.100 | | | | |
| 8 | IR-filter | Plano | 0.700 | Glass | 1.517 | 64.2 | — |
| 9 | | Plano | 1.271 | | | | |
| 10 | Image | Plano | — | | | | |

Note:
Reference wavelength is d-line 587.6 nm

In Table 3-1, the first lens element 310 is made of glass. The second lens element 320 and the third lens element 330 are made of plastic. The first lens element 310, the second lens element 320, and the third lens element 330 are aspheric, and the aspheric surfaces can satisfy Condition ASP, but are not limited thereto. As for the parameters of the aspheric surfaces, reference is made to Table 3-2 below.

TABLE 3-2

Aspheric Coefficients

| | Surface# | | |
|---|---|---|---|
| | 2 | 3 | 4 |
| k | −9.14103E+00 | 1.34758E+02 | −1.21765E+00 |
| $A_4$ | 1.63739E−01 | −7.78227E−02 | 8.75891E−02 |
| $A_6$ | −1.79024E−01 | −2.07500E−01 | −6.34442E−02 |
| $A_8$ | 1.31365E−01 | 2.02061E−01 | 3.87660E−01 |
| $A_{10}$ | −9.63247E−02 | −1.82592E−01 | −1.01609E−01 |
| $A_{12}$ | 9.24424E−03 | — | −2.12892E−01 |

| | Surface# | | |
|---|---|---|---|
| | 5 | 6 | 7 |
| k | −1.35828E+00 | −7.45242E+01 | −1.00000E+00 |
| $A_4$ | −4.93372E−02 | −1.25879E−02 | −1.33268E−02 |
| $A_6$ | 3.15290E−01 | 5.16175E−03 | 3.17506E−04 |
| $A_8$ | −7.49957E−02 | −1.44615E−03 | 6.33543E−05 |
| $A_{10}$ | 3.97755E−02 | 2.93241E−04 | −5.10778E−05 |
| $A_{12}$ | −3.76869E−02 | −3.51199E−05 | 1.07695E−08 |

The content of Table 3-3 may be deduced from Table 3-1.

TABLE 3-3

Embodiment 3

| f (mm) | 4.39 | $f_1/R_2$ | 0.33 |
|---|---|---|---|
| Fno | 2.95 | $R_3/f$ | −0.12 |
| HFOV(deg.) | 37.4 | $R_1/R_2$ | 0.15 |
| $V_1 - V_2$ | 40.4 | $(R_3 + R_4)/(R_3 - R_4)$ | −4.76 |
| SL/TTL | 0.98 | $CT_2/CT_3$ | 0.20 |
| TTL/ImgH | 1.81 | $CT_3/\Sigma CT$ | 0.61 |
| $f/f_1$ | 1.12 | $T_{12}/CT_1$ | 1.120 |
| $|f_1/f_2|$ | 0.98 | $CT_2/f$ | 0.07 |
| $f/R_6$ | −0.87 | | |

FIG. 3B is a schematic view of longitudinal spherical aberration curves when the lights having wavelengths of 486.1 nm, 587.6 nm, and 656.3 nm are respectively projected in the optical lens assembly in FIG. 3A. It can be observed from FIG. 3B that, when the different wavelengths, 486.1 nm, 587.6 nm, and 656.3 nm, of the light are received by the optical lens assembly 30, the longitudinal spherical aberrations generated by the optical lens assembly 30 are within a range of −0.05 mm to 0.05 mm.

FIG. 3C is a schematic view of astigmatic field curves when the light having the wavelength of 587.6 nm is projected in the optical lens assembly in FIG. 3A. It can be observed from FIG. 3C that, when the light having the wavelength of 587.6 nm is projected in the optical lens assembly 30, the astigmatic field curvature of the tangential plane is within a range of −0.3 mm to 0.0 mm, and the astigmatic field curvature of the sagittal plane is within a range of −0.3 mm to 0.0 mm.

FIG. 3D is a schematic view of a distortion curve when the light having the wavelength of 587.6 nm is projected in the optical lens assembly in FIG. 3A. It can be observed from FIG. 3D that when the light having the wavelength of 587.6 nm is projected in the optical lens assembly 30, the distortion ratio is within a range of −1.5% to 0%. As shown in FIGS. 3B to 3D, the optical lens assembly 30, designed according to the third embodiment, is capable of effectively correcting various aberrations.

The Fourth Embodiment

Embodiment 4

FIG. 4A is a schematic structural view of a fourth embodiment of the optical lens assembly according to the present disclosure. The specific implementation and elements of the fourth embodiment are substantially the same as those in the first embodiment. The element symbols in the fourth embodiment all begin with "4", which correspond to those in the first embodiment with the same function or structure. For conciseness, only the differences are illustrated below, and the similarities will not be repeated herein.

In this embodiment, for example, the wavelength of the light received by the optical lens assembly 40 is 587.6 nm, but the wavelength may be adjusted according to actual requirements, and is not limited to the wavelength value mentioned above.

In this embodiment, a first lens element 410 with positive refractive power comprises a convex object-side surface 411. A second lens element 420 with negative refractive power comprises a concave object-side surface 421, a convex image-side surface 422, and two inflection points 423 on the radial section of the second lens element 420 shown in FIG. 4A. A third lens element 430 with positive refractive power comprises a convex object-side surface 431 and a convex image-side surface 432.

The detailed data of the optical lens assembly 40 is as shown in Table 4-1 below.

TABLE 4-1

Embodiment 4
f = 4.37 mm, Fno = 2.95, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.130 | | | | |
| 2 | Lens 1 | 1.772070 (ASP) | 0.607 | Glass | 1.487 | 70.4 | 4.14 |
| 3 | | 12.899600 (ASP) | 0.671 | | | | |
| 4 | Lens 2 | −0.533650 (ASP) | 0.288 | Plastic | 1.634 | 23.8 | −3.83 |
| 5 | | −0.827360 (ASP) | 0.050 | | | | |
| 6 | Lens 3 | 3.554900 (ASP) | 1.100 | Plastic | 1.544 | 55.9 | 3.95 |
| 7 | | −4.858700 (ASP) | 1.400 | | | | |
| 8 | IR-filter | Plano | 0.700 | Glass | 1.517 | 64.2 | — |
| 9 | | Plano | 1.300 | | | | |
| 10 | Image | Plano | — | | | | |

Note:
Reference wavelength is d-line 587.6 nm

In Table 4-1, the first lens element 410 is made of glass. The second lens element 420 and the third lens element 430 are made of plastic. The first lens element 410, the second lens element 420, and the third lens element 430 are aspheric, and the aspheric surfaces can satisfy Condition ASP, but are not limited thereto. As for the parameters of the aspheric surfaces, reference is made to Table 4-2 below.

TABLE 4-2

Aspheric Coefficients

| | Surface# | | |
|---|---|---|---|
| | 2 | 3 | 4 |
| k | −8.99058E+00 | 1.31889E+02 | −1.22197E+00 |
| $A_4$ | 1.65680E−01 | −7.55882E−02 | 8.99769E−02 |
| $A_6$ | −1.75630E−01 | −2.07759E−01 | −6.06304E−02 |
| $A_8$ | 1.33735E−01 | 1.96559E−01 | 3.90195E−01 |
| $A_{10}$ | −1.00271E−01 | −1.96444E−01 | −9.84879E−02 |
| $A_{12}$ | −2.37057E−02 | — | −2.20814E−01 |

| | Surface# | | |
|---|---|---|---|
| | 5 | 6 | 7 |
| k | −1.35553E+00 | −7.38999E+01 | −1.00000E+00 |
| $A_4$ | −4.97502E−02 | −1.19814E−02 | −1.34324E−02 |
| $A_6$ | 3.14918E−01 | 5.29529E−03 | 3.96181E−04 |
| $A_8$ | −7.53205E−02 | −1.42514E−03 | 6.52057E−05 |
| $A_{10}$ | 3.92590E−02 | 3.04293E−04 | −5.64498E−05 |
| $A_{12}$ | −3.76787E−02 | −4.24574E−05 | −2.22587E−06 |

The content of Table 4-3 may be deduced from Table 4-1.

TABLE 4-3

Embodiment 4

| f (mm) | 4.37 | $f_1/R_2$ | 0.32 |
| Fno | 2.95 | $R_3/f$ | −0.12 |
| HFOV(deg.) | 37.5 | $R_1/R_2$ | 0.14 |
| $V_1 - V_2$ | 46.6 | $(R_3 + R_4)/(R_3 - R_4)$ | −4.63 |
| SL/TTL | 0.98 | $CT_2/CT_3$ | 0.26 |

TABLE 4-3-continued

Embodiment 4

| TTL/ImgH | 1.78 | $CT_3/\Sigma CT$ | 0.55 |
| $f/f_1$ | 1.06 | $T_{12}/CT_1$ | 1.105 |

TABLE 4-3-continued

Embodiment 4

| $|f_1/f_2|$ | 1.08 | $CT_2/f$ | 0.07 |
| $f/R_6$ | −0.90 | | |

FIG. 4B is a schematic view of longitudinal spherical aberration curves when the lights having a wavelength of 486.1 nm, 587.6 nm, and 656.3 nm are respectively projected in the optical lens assembly in FIG. 4A. It can be observed from FIG. 4B that, when the different wavelengths, 486.1 nm, 587.6 nm, and 656.3 nm, of the light are received by the optical lens assembly 40, the longitudinal spherical aberrations generated by the optical lens assembly 40 are within a range of −0.05 mm to 0.04 mm.

FIG. 4C is a schematic view of astigmatic field curves when the light having the wavelength of 587.6 nm is projected in the optical lens assembly in FIG. 4A. It can be observed from FIG. 4C that when the light having the wavelength of 587.6 nm is projected in the optical lens assembly 40, the astigmatic field curvature of the tangential plane generated is within a range of −0.25 mm to 0.0 mm, and the astigmatic field curvature of the sagittal plane is within a range of −0.2 mm to 0.0 mm.

FIG. 4D is a schematic view of a distortion curve when the light having the wavelength of 587.6 nm is projected in the optical lens assembly in FIG. 4A. It can be observed from FIG. 4D that the distortion ratio generated when the light having the wavelength of 587.6 nm is projected in the optical lens assembly 40 is within a range of 1.5% to 0%. As shown in FIGS. 4B to 4D, the optical lens assembly 40, designed according to the fourth embodiment, is capable of effectively correcting various aberrations.

The Fifth Embodiment

Embodiment 5

FIG. 5A is a schematic structural view of a fifth embodiment of the optical lens assembly according to the present disclosure. The specific implementation and elements of the fifth embodiment are substantially the same as those in the first embodiment. The element symbols in the fifth embodiment all begin with "5", which correspond to those in the first embodiment with the same function or structure. For conciseness, only the differences are illustrated below, and the similarities will not be repeated herein.

In this embodiment, for example, the wavelength of the light received by the optical lens assembly 50 is 587.6 nm, but the wavelength may be adjusted according to actual requirements, and is not limited to the wavelength value mentioned above.

In this embodiment, a first lens element 510 with positive refractive power comprises a convex object-side surface 511. A second lens element 520 with negative refractive power comprises a concave object-side surface 521, a convex image-side surface 522, and two inflection points 523 on the radial section of the second lens element 520 shown in FIG. 5A. A third lens element 530 with positive refractive power comprises a convex object-side surface 531 and a convex image-side surface 532.

The detailed data of the optical lens assembly 50 is as shown in Table 5-1 below.

TABLE 5-1

Embodiment 5
f = 4.37 mm, Fno = 2.85, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. | Plano | −0.120 | | | | |
| 2 | Lens 1 | 1.921050 | 0.695 | Plastic | 1.514 | 56.8 | 3.46 |
| 3 | | −20.790000 | 0.731 | | | | |
| 4 | Lens 2 | −0.539530 | 0.297 | Plastic | 1.634 | 23.8 | −3.51 |
| 5 | | −0.864710 | 0.068 | | | | |
| 6 | Lens 3 | 2.829640 | 1.780 | Plastic | 1.530 | 55.8 | 4.37 |
| 7 | | −9.939900 | 0.900 | | | | |
| 8 | IR-filter | Plano | 0.700 | Glass | 1.517 | 64.2 | — |
| 9 | | Plano | 0.874 | | | | |
| 10 | Image | Plano | — | | | | |

Note:
Reference wavelength is d-line 587.6 nm

In Table 5-1, the first lens element 510, the second lens element 520 and the third lens element 530 are made of plastic. The first lens element 510, the second lens element 520, and the third lens element 530 are aspheric, and the aspheric surfaces can satisfy Condition ASP, but are not limited thereto. As for the parameters of the aspheric surfaces, reference is made to Table 5-2 below.

TABLE 5-2

Aspheric Coefficients

| | Surface# | | |
|---|---|---|---|
| | 2 | 3 | 4 |
| k | −1.09327E+01 | 1.81219E+02 | −1.21020E+00 |
| $A_4$ | 1.52203E−01 | −8.77749E−02 | 8.90232E−02 |
| $A_6$ | −1.94465E−01 | −2.14316E−01 | −5.17466E−02 |
| $A_8$ | 1.13389E−01 | 2.16338E−01 | 4.06331E−01 |
| $A_{10}$ | −1.08349E−01 | −1.33652E−01 | −8.02296E−02 |
| $A_{12}$ | 1.35801E−03 | — | −1.95188E−01 |

TABLE 5-2-continued

Aspheric Coefficients

| | Surface# | | |
|---|---|---|---|
| | 5 | 6 | 7 |
| k | −1.37297E+00 | −4.27901E+01 | 6.65512E−01 |
| $A_4$ | −4.89971E−02 | −1.57586E−02 | −1.42947E−02 |
| $A_6$ | 3.13834E−01 | 5.05811E−03 | 3.92202E−04 |
| $A_8$ | −7.63431E−02 | −1.34203E−03 | 7.55476E−05 |
| $A_{10}$ | 3.96914E−02 | 3.19065E−04 | −4.41071E−05 |
| $A_{12}$ | −3.63670E−02 | −3.42491E−05 | 2.51814E−06 |

The content of Table 5-3 may be deduced from Table 5-1.

TABLE 5-3

Embodiment 5

| f (mm) | 4.37 | $f_1/R_2$ | −0.17 |
|---|---|---|---|
| Fno | 2.85 | $R_3/f$ | −0.12 |
| HFOV(deg.) | 37.3 | $R_1/R_2$ | −0.09 |
| $V_1 − V_2$ | 33.0 | $(R_3 + R_4)/(R_3 − R_4)$ | −4.32 |

TABLE 5-3-continued

Embodiment 5

| SL/TTL | 0.98 | $CT_2/CT_3$ | 0.17 |
|---|---|---|---|
| TTL/ImgH | 1.76 | $CT_3/\Sigma CT$ | 0.64 |
| $f/f_1$ | 1.26 | $T_{12}/CT_1$ | 1.05 |
| $|f_1/f_2|$ | 0.99 | $CT_2/f$ | 0.07 |
| $f/R_6$ | −0.44 | | |

FIG. 5B is a schematic view of longitudinal spherical aberration curves when the lights having wavelengths of 486.1 nm, 587.6 nm, and 656.3 nm are respectively projected in the optical lens assembly in FIG. 5A. It can be observed from FIG. 5B that, when the different wavelengths, 486.1 nm, 587.6 nm, and 656.3 nm, of the light are received by the optical lens assembly 50, the longitudinal spherical aberrations generated by the optical lens assembly 50 are within a range of −0.06 mm to 0.05 mm.

FIG. 5C is a schematic view of astigmatic field curves when the light having the wavelength of 587.6 nm is projected in the optical lens assembly in FIG. 5A. It can be observed from FIG. 5C that when the light having the wavelength of 587.6 nm is projected in the optical lens assembly 50, the astigmatic field curvature of the tangential plane generated is within a range of −0.1 mm to 0.0 mm, and the astigmatic field curvature of the sagittal plane is within a range of −0.15 mm to 0.0 mm.

FIG. 5D is a schematic view of a distortion curve when the light having the wavelength of 587.6 nm is projected in the optical lens assembly in FIG. 5A. It can be observed from FIG. 5D that, the distortion ratio generated when the light having the wavelength of 587.6 nm is projected in the optical lens assembly 50 is within a range of −1.0% to 0%. As shown in FIGS. 5B to 5D, the optical lens assembly 50, designed according to the fourth embodiment, is capable of effectively correcting various aberrations.

What is claimed is:

1. An optical lens assembly comprising, in an order from an object side to an image side:
    a first lens element with positive refractive power, wherein the object-side surface of the first element is convex;
    a second lens element with negative refractive power, wherein the object-side surface of the second element is concave, the image-side surface of the second lens element is convex, the second lens element is made of plastic, and the object-side and the image-side surfaces of the second lens element are aspheric; and
    a third lens element with positive refractive power, wherein the object-side surface of the third element and the image-side surface of the third lens element are convex;
    wherein, there are only three lens elements with refractive power in the optical lens assembly, $T_{12}$ is an axial distance between the first lens element and the second lens element; $CT_1$ is a central thickness of the first lens element; $f_1$ is a focal length of the first lens element; $R_2$ is a radius of curvature of the image-side surface of the first lens element; $CT_3$ is a central thickness of the third lens element, $\Sigma CT$ is the sum of the central thicknesses of the first lens element, the second lens element and the third lens element, R3 is a radius of curvature of the object-side surface of the second lens element, and R4 is a radius of curvature of the image-side surface of the second lens element, and following conditions are satisfied:

$0.9 < T_{12}/CT_1 < 1.4$;

$-0.4 < f_1/R_2 < 0.6$;

$0.45 < CT_3/\Sigma CT < 0.75$; and $-6.0 < (R3+R4)/(R3-R4) < -3.0$.

2. The optical lens assembly according to claim 1, wherein $R_1$ is a radius of curvature of the object-side surface of the first lens element, and the optical lens assembly satisfies the following condition: $-0.20 < R_1/R_2 < 0.25$.

3. The optical lens assembly according to claim 1, wherein f is a focal length of the optical lens assembly, and the optical lens assembly satisfies the following condition: $0.95 < f/f_1 < 1.35$.

4. The optical lens assembly according to claim 1, wherein $CT_2$ is a central thickness of the second lens element, and the optical lens assembly satisfies the following condition: $0.05 < CT_2/CT_3 < 0.4$.

5. The optical lens assembly according to claim 1, wherein $f_2$ is a focal length of the second lens element, and the optical lens assembly satisfies the following condition: $0.9 < |f_1/f_2| < 1.2$.

6. The optical lens assembly according to claim 1, wherein $V_1$ is an Abbe number of the first lens element, $V_2$ is an Abbe number of the second lens element, and the optical lens assembly satisfies the following condition: $30.0 < V_1 - V_2 < 47.0$.

7. The optical lens assembly according to claim 1, wherein the optical lens assembly further comprises a stop and an image plane, SL is an axial distance between the stop and the image plane, TTL is an axial distance between the object-side surface of the first lens element and the image plane, and the optical lens assembly satisfies the following condition: $0.9 < SL/TTL < 1.1$.

8. The optical lens assembly according to claim 7, wherein f is a focal length of the optical lens assembly, and the optical lens assembly satisfies the following condition: $-0.15 < R_3/f < -0.05$.

9. The optical lens assembly according to claim 1, wherein f is a focal length of the optical lens assembly, $CT_2$ is a central thickness of the second lens element, and the optical lens assembly satisfies the following condition: $0 < CT_2/f < 0.13$.

10. The optical lens assembly according to claim 1, wherein f is a focal length of the optical lens assembly, $R_6$ is a radius of curvature of the image-side surface of the third lens element, and the optical lens assembly satisfies the following condition: $-1.0 < f/R_6 < -0.2$.

11. The optical lens assembly according to claim 1, wherein there is at least one inflection point on the second lens element.

12. The optical lens assembly according to claim 1, wherein the optical lens assembly further comprises an image sensor and an image plane, TTL is an axial distance between the object-side surface of the first lens element and the image plane, ImgH is half of the diagonal length of the effective photosensitive area of the image sensor, and the optical lens assembly satisfies the following condition: $TTL/ImgH < 1.85$.

13. An optical lens assembly comprising, in an order from an object side to an image side:
    a first lens element with positive refractive power, wherein the object-side surface of the first element is convex;
    a second lens element with negative refractive power, wherein the object-side surface of the second element is concave, and the image-side surface of the second lens element is convex; and
    a third lens element with positive refractive power, wherein the object-side surface and the image-side surface of the third lens element are convex;
    wherein, there are only three lens elements with refractive power in the optical lens assembly, $R_1$ is a radius of curvature of the object-side surface of the first lens element; $R_2$ is a radius of curvature of the image-side surface of the first lens element, f is a focal length of the optical lens assembly, $f_1$ is a focal length of the first lens element, $CT_3$ is a central thickness of the third lens element, $\Sigma CT$ is the sum of the central thicknesses of the first lens element, the second lens element and the third lens element, $V_1$ is an Abbe number of the first lens element, $V_2$ is an Abbe number of the second lens element, and following conditions are satisfied:

$-0.2 < R_1/R_2 < 0.25$;

$0.95 < f/f_1 < 1.35$;

$0.45 < CT_3/\Sigma CT < 0.75$; and $30.0 < V_1 - V_2 < 47.0$.

14. The optical lens assembly according to claim 13, wherein the optical lens assembly further comprises an image sensor and an image plane, TTL is an axial distance between the object-side surface of the first lens element and the image plane, ImgH is half of the diagonal length of the effective photosensitive area of the image sensor, and the optical lens assembly satisfies the following condition: TTL/ImgH<1.85.

15. The optical lens assembly according to claim 13, wherein the second lens element is made of plastic, and the object-side and the image-side surfaces of the second lens element are aspheric.

16. The optical lens assembly according to claim 15, wherein the optical lens assembly further comprises a stop and an image plane, SL is an axial distance between the stop and the image plane, TTL is an axial distance between the object-side surface of the first lens element and the image plane, and the optical lens assembly satisfies the following condition: 0.9<SL/TTL<1.1.

17. The optical lens assembly according to claim 16, wherein $R_3$ is a radius of curvature of the object-side surface of the second lens element, and the optical lens assembly satisfies the following condition: $-0.15<R_3/f<-0.05$.

18. The optical lens assembly according to claim 16, wherein $T_{12}$ is an axial distance between the first lens element and the second lens element, $CT_1$ is a central thickness of the first lens element, and the optical lens assembly satisfies the following condition: $0.9<T_{12}/CT_1<1.4$.

19. The optical lens assembly according to claim 16, further satisfying the following condition: $-0.4<f_1/R_2<0.6$.

20. The optical lens assembly according to claim 16, wherein $CT_2$ is a central thickness of the second lens element, and the optical lens assembly satisfies the following condition: $0<CT_2/f<0.13$.

21. The optical lens assembly according to claim 16, wherein $R_6$ is a radius of curvature of the image-side surface of the third lens element, and the optical lens assembly satisfies the following condition: $-1.0<f/R_6<-0.2$.

* * * * *